United States Patent [19]
Goodman

[11] Patent Number: 4,989,466
[45] Date of Patent: Feb. 5, 1991

[54] GYROSCOPICALLY STABILIZED SENSOR POSITIONING SYSTEM

[76] Inventor: Ronald C. Goodman, 12302 Montana Ave., #303, Los Angeles, Calif. 90049

[21] Appl. No.: 388,660
[22] Filed: Aug. 2, 1989
[51] Int. Cl.$^5$ .......................... G01C 19/16; G03B 5/00
[52] U.S. Cl. ...................................... 74/5.22; 74/5.34; 352/243; 354/70
[58] Field of Search .................. 74/5.34, 5.22; 354/70; 350/500; 358/222, 229; 352/243

[56] References Cited

U.S. PATENT DOCUMENTS

| | | | |
|---|---|---|---|
| 2,883,863 | 4/1959 | Karsten et al. | 74/5.34 X |
| 2,955,474 | 10/1960 | Sutherland | 74/5.34 |
| 2,963,242 | 12/1960 | Mueller | 74/5.34 X |
| 3,335,614 | 8/1967 | Ellis | 74/5.34 |
| 3,517,563 | 6/1970 | Will | 74/5.34 |
| 3,638,502 | 2/1972 | Leavitt et al. | 74/5.42 X |
| 4,826,310 | 5/1989 | Goodman | 242/199 X |

Primary Examiner—Rodney H. Bonck
Attorney, Agent, or Firm—Blakely, Sokoloff Taylor & Zafman

[57] ABSTRACT

A stabilized platform for mounting a camera or other sensor is suspended from a support post by a universal or Cardan joint with two torque motors powering its axes. Below this universal joint is a rotational joint also powered by a torque motor. A gyro stabilizer assembly comprising three orthogonally arranged gyroscopes is mounted on the platform. Position sensors detect the precession angles of the three gyroscopes and provide inputs to servo control loops which deliver drive signals to the torque motors. The platform including the gyro stabilizer assembly and the payload of camera or other sensor is configured such that the center of gravity is precisely located at the intersection of the three motor driven axes so as to eliminate unwanted torquing moments as a result of vehicle accelerations.

28 Claims, 10 Drawing Sheets

GYROSCOPICALLY STABILIZED SENSOR POSITIONING SYSTEM

BACKGROUND OF THE INVENTION

1. FIELD OF THE INVENTION

This invention relates to the field of gyroscopically stabilized systems and, particularly, to a system for providing space stabilization of a sensor carried by an aircraft or other vehicle.

2. BACKGROUND ART

Cameras and other types of sensors require stabilization when mounted on vehicles that are subject to movement and vibration. Various systems for providing gyroscopic stabilization of cameras and other sensors are known in the art. One such system is disclosed in U.S. Pat. No. 3,638,502 issued to Leavitt et al. This patent describes a camera platform that is stabilized in part by means of a plurality of gyroscopes which provide an artificially amplified mass and in part by the mechanical movement of a system of real masses. In the system as disclosed, disturbances not compensated for by the action of the gyroscopes are removed by shifting the center of gravity of the system by means of a mass suspended at the end of a motor driven pendulum. The reaction time of such a motor driven system is necessarily limited such that the system is unable to compensate for sudden accelerations. This, in turn, results in lag and overshoot in a highly dynamic environment.

The system of Leavitt et al. places the center of gravity of the camera platform somewhat below a universal joint so that the system will tend to assume a level orientation. However, such an arrangement also induces undesirable torquing moments in the universal joint as the system encounters lateral accelerations. Consequently, stability of the system is further degraded.

In view of the inherent limitations of prior art gyroscopically stabilized camera systems, it is an object of the present invention to provide a system wherein all axes of the system are directly driven by torque motors such that the system is highly responsive to destabilizing inputs.

It is a further object of the present invention to provide a system wherein the center of gravity of the system is precisely located at the intersection of the rotational axes so as to minimize unwanted torquing moments.

It is yet another object of the present invention to provide a gyroscopically stabilized camera system incorporating automatic steering such that a fixed object may be automatically inertially tracked.

SUMMARY OF THE INVENTION

The present invention provides a stabilized platform for mounting a camera or other sensor. The platform is suspended from a support post by a universal or Cardan joint with two torque motors powering its axes. Below this universal joint is a rotational joint also powered by a torque motor. A gyro stabilizer assembly comprising three orthogonally arranged gyroscopes is mounted on the platform. Position sensors detect the precession angles of the three gyroscopes and provide inputs to servo control loops which deliver drive signals to the torque motors.

The platform including the gyro stabilizer assembly and the payload of camera or other sensor is configured such that the center of gravity is precisely located at the intersection of the three motor driven axes so to as eliminate unwanted torquing moments as a result of vehicle accelerations.

A fourth gyroscope, also mounted on the platform, is used for providing a vertical reference and has outputs that are injected into the servo circuitry controlling the torquer motors so that the platform remains approximately level at all times. Angular position sensors on the pitch and roll axes of the universal joint provide inputs to the torque motor drive electronics so that the platform may be maintained approximately level and steady until the gyroscopes are brought up to speed.

The camera or other sensor is steered by an operator in both azimuth (pan angle) and elevation (tilt angle). Such steering is effectuated by a pan motor which causes the platform and gyro stabilizer assembly to rotate with respect to one another and by a tilt motor which directly controls the tilt of the camera or other sensor. Operator input for both pan and tilt commands is accomplished through a joy stick control on the operator's console. Pan and tilt drive commands are injected into the servo control loops to provide anticipation for the inertial transients that are induced by the operator's commands.

DETAILED DESCRIPTION OF THE INVENTION

In the following description, for purposes of explanation and not limitation, specific numbers, dimensions, materials, etc. are set forth in order to provide a thorough understanding of the present invention. However, it will be apparent to one skilled in the art that the present invention may be practiced in other embodiments that depart from these specific details. In other instances, well known components and circuits are not described at length so as not to obscure the disclosure of the present invention with unnecessary detail.

Figure 1:
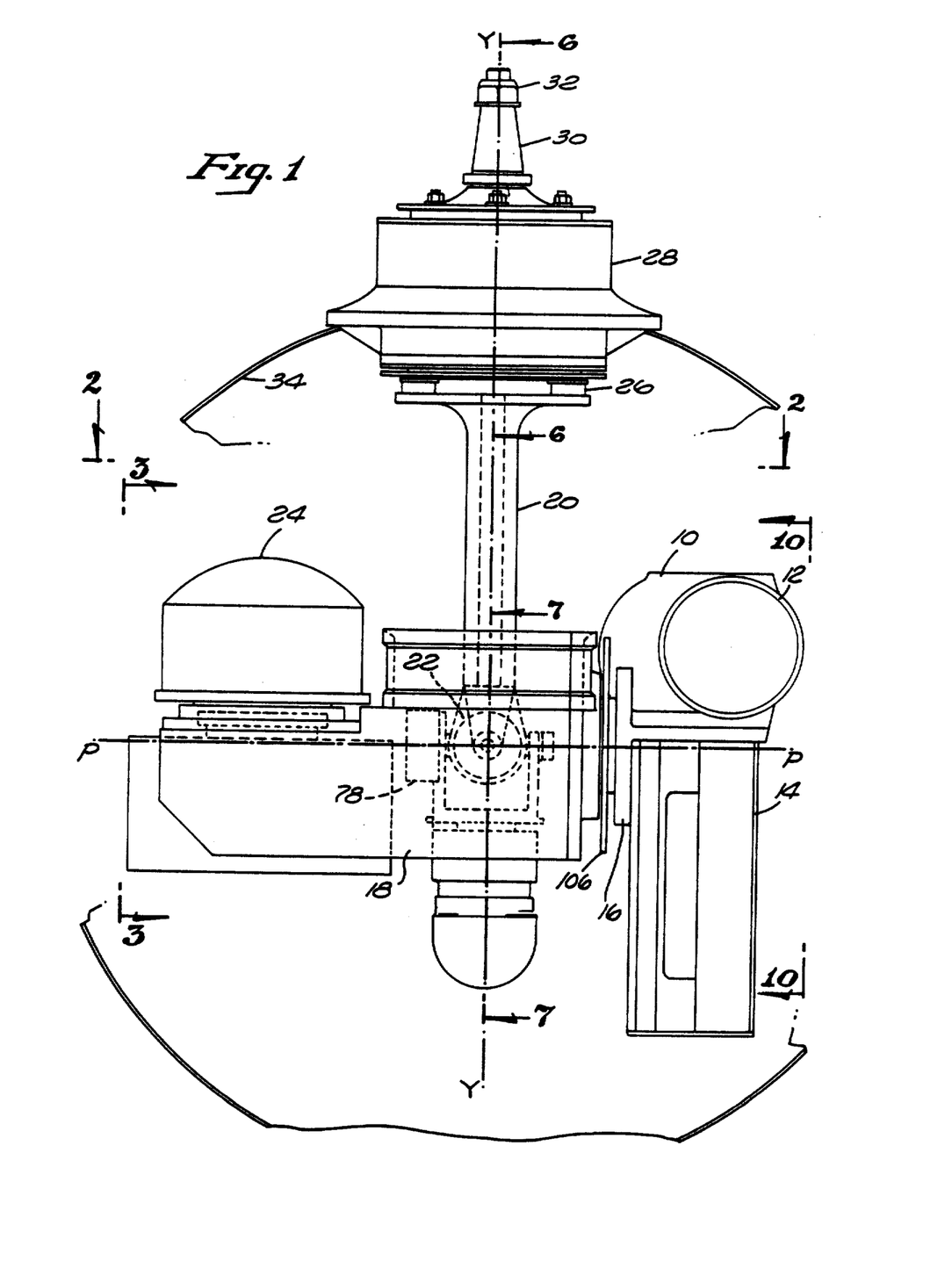
FIG. 1 is a front elevation view of a gyroscopically stabilized camera system according to the present invention.
Figure 2:
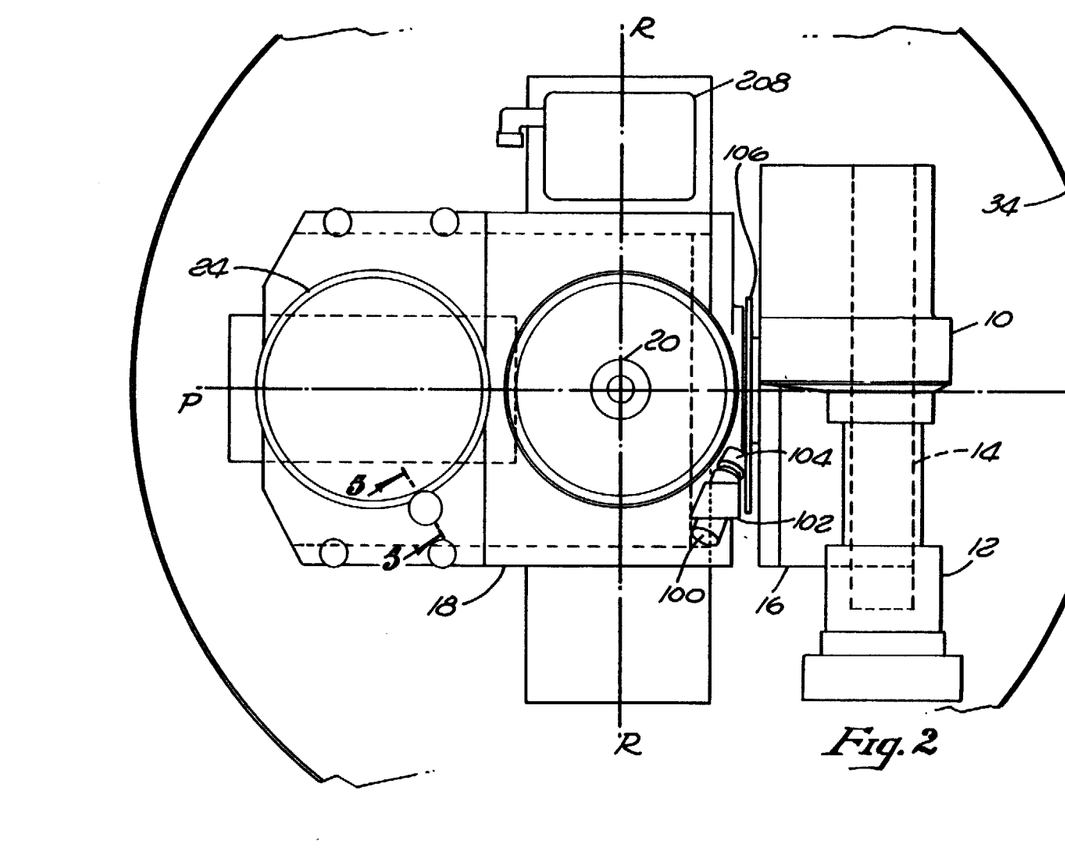
FIG. 2 is a plan view of the system shown in FIG. 1 as indicated by line 2—2.
Figure 3:
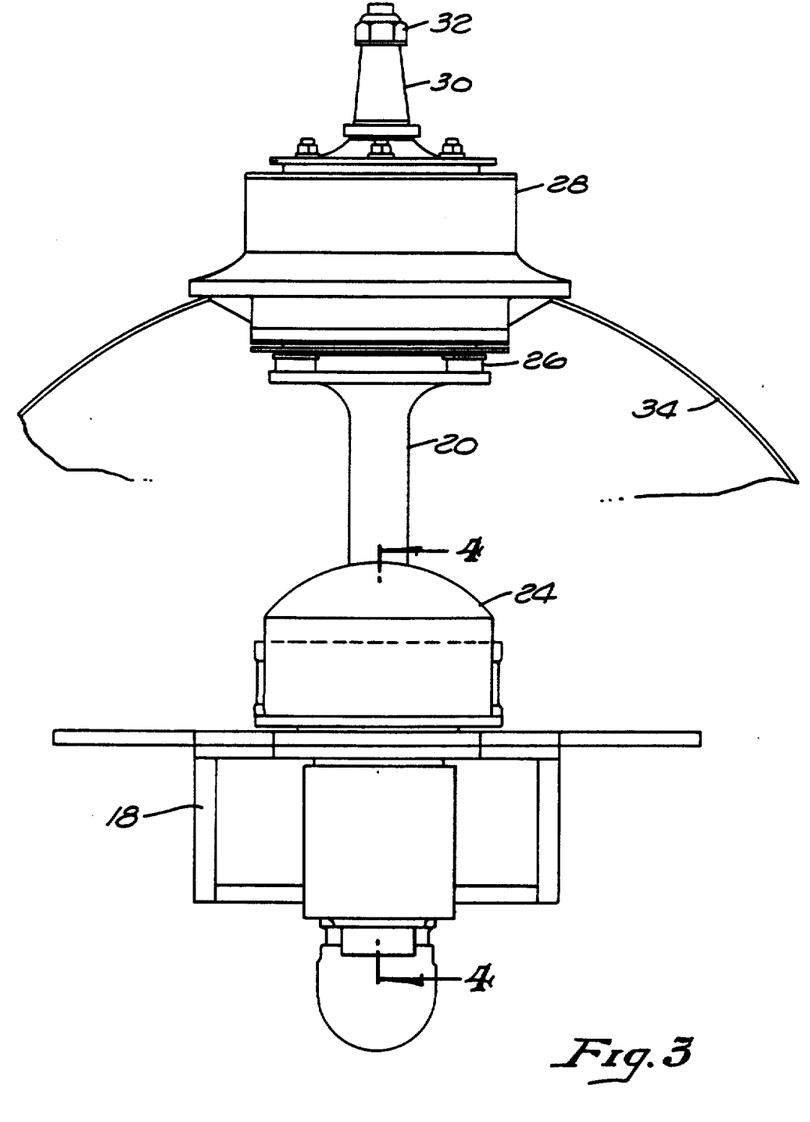
FIG. 3 a side elevation view of the system shown in FIG. 1 as indicated by line 3—3.

Referring first to FIGS. 1—3, a gyroscopically stabilized camera system according to the present invention is shown in frontal elevation, plan view and side elevation, respectively. This system is adapted for use with a camera 10 which, in the described embodiment, is a 35 mm motion picture camera. While the present invention is described in connection with a particular type of camera 10, it will be recognized that the system may be adapted for use with other types of cameras, and, indeed, with a wide variety of sensor devices. Thus, it is to be understood that the present invention is directed to a system for providing a space stabilized platform and is not to be construed as limited in any way to the particular camera described herein.

Camera 10 is fitted with a lens 12. Lens 12 may be a fixed or zoom lens depending upon the requirements of the filming session. However, particularly advantageous use of the present invention may be had by fitting camera 10 with a zoom lens as will be subsequently described. Camera 10 is also fitted with a film magazine 14. While magazine 14 may be a standard film magazine as are well known in the art, the movement of film from the supply reel in the magazine through the camera to the take-up reel can involve a substantial transfer of mass if large quantities of film are exposed. Such a transfer of mass causes a shift in the center of gravity of the overall system, thereby requiring compensation in some manner. In order to avoid the need for such compensation within the stabilization system itself, it is desirable that magazine 14 be of a design that maintains a constant center of gravity. Such a magazine is described in U.S. Pat. No. 4,826,310 issued on May 2, 1989 to this inventor.

For the sake of clarity, it is convenient to define a coordinate system in terms of pitch, roll and yaw axes. Referring to FIG. 1, the pitch axis lies in the plane of the drawing as shown by lines P-P. The yaw axis is also in the plane of the drawing perpendicular to the pitch axis as shown by line Y-Y. The roll axis is perpendicular to the plane of FIG. 1 and extends through the intersection of the pitch and yaw axes as shown by line R-R in FIG. 2. Camera orientation is defined in terms of azimuth or pan angle and elevation or tilt angle.

The major components of the stabilization system are mounted to platform 18 which provides a rigid support structure stabilized in spatial coordinates. Platform 18 is suspended from support post 20 and is coupled thereto by a universal or Cardan joint 22. Joint 22 provides freedom of motion in both the pitch and roll axes. Platform 18 supports gyroscopic stabilizer assembly 24 which, as will be subsequently described, maintains platform 18 in a constant space stabilized orientation.

Figure 10:
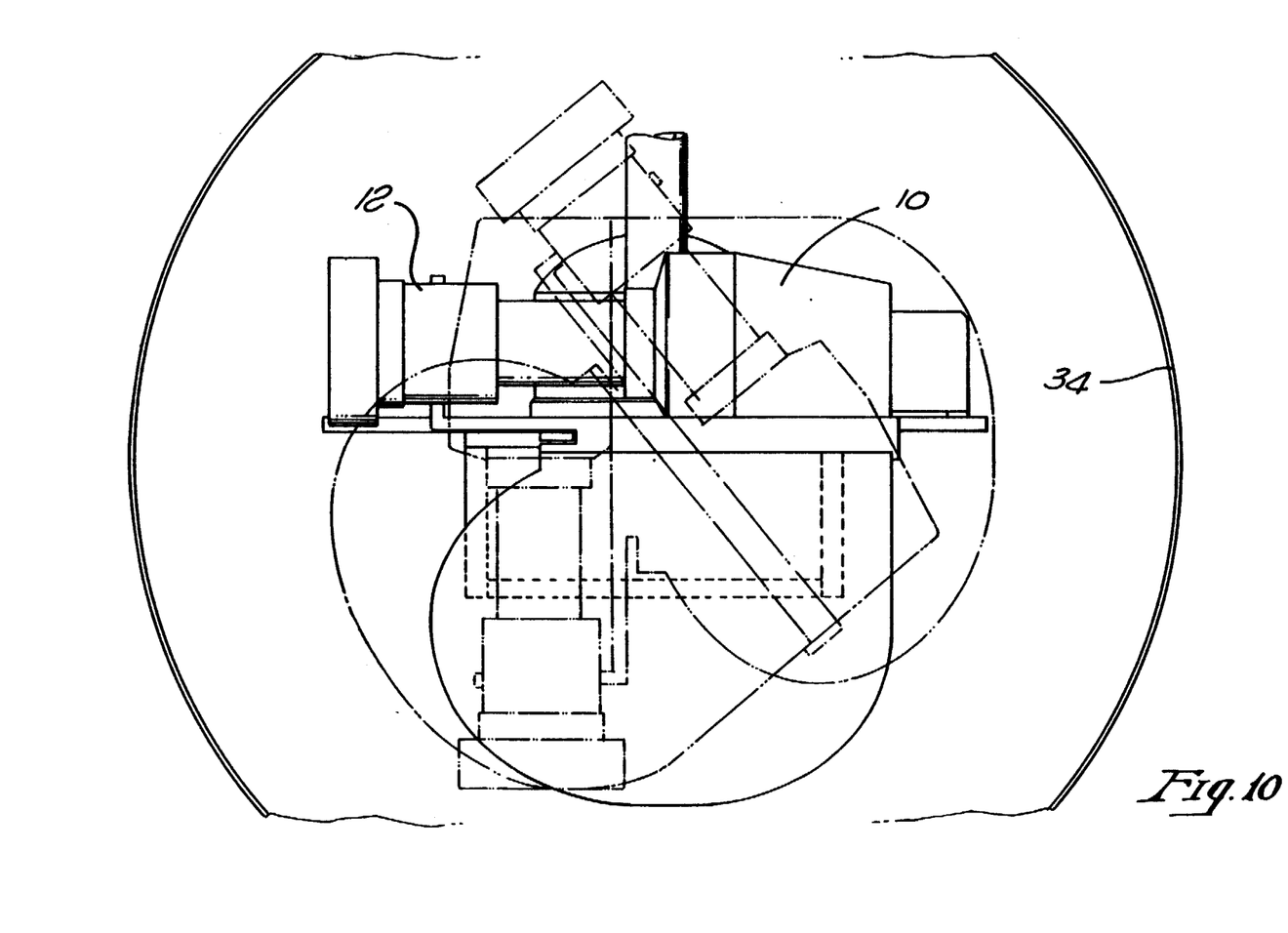
FIG. 10 is a side elevation view of the system illustrating the tilt limits of the camera.

The camera system comprising camera 10, lens 12 and film magazine 14 is pivotally secured to platform 18 by camera mounting bracket 16. Bracket 16 pivots about the tilt axis so that the pointing angle of camera 10 can be varied in elevation. Referring primarily to FIG. 3, bracket 16, and hence camera 10, is driven in tilt angle by tilt motor 100 which is attached to platform 18 by bracket 102. An elastomeric conical drive wheel 104 is mounted on the shaft of motor 100 and bears against sector 106 which is rigidly coupled to bracket 16. The tilt angle of camera 10 can be varied from approximately +30° to approximately −90° as illustrated in phantom lines in FIG. 10.

Figure 6:
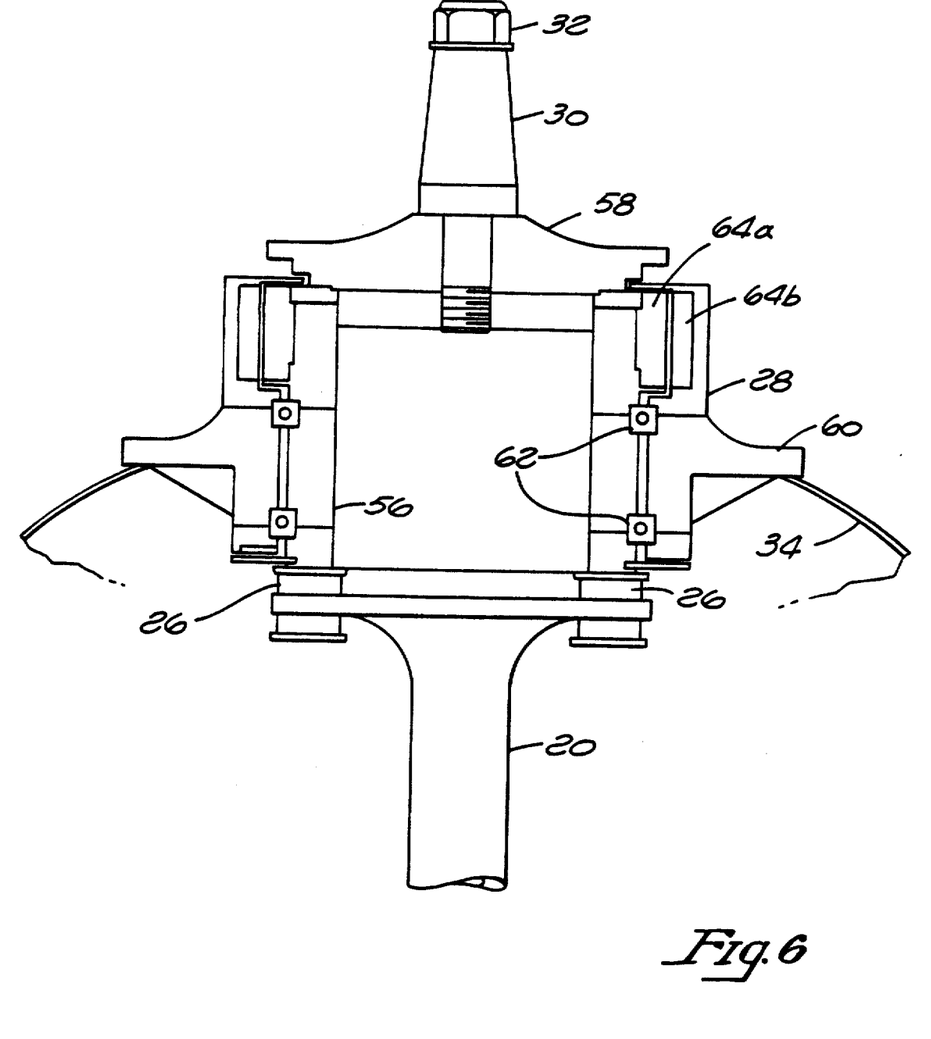
FIG. 6 a detailed cross sectional view of the upper bearing assembly taken through line 6—6 of FIG. 1.

Referring now to FIGS. 1 and 6, support post 20 is coupled to bearing and motor assembly 28 by support bushings 26. Assembly 28 is secured to an airplane, helicopter or other vehicle by means of tapered pin 30. Pin 30 is secured within a correspondingly tapered socket (not shown) by means of nut 32. The socket into which pin 30 is inserted is securely mounted to the structure of the vehicle at a location such that there is sufficient clearance for the stabilized system and its enclosure to be suspended therefrom. Support bushings 26 are made of an elastomeric material to provide both vertical and lateral, compliance to isolate the stabilized system from shock and vibration of the vehicle on which it is carried.

The stabilized system is preferably enclosed within a spherical enclosure or dome 34. Dome 34 is secured to the rotating portion of bearing and motor assembly 28 so as to rotate therewith a full 360° about support post 20. Dome 34 protects the stabilized system from air turbulence and wind buffeting and also provides a streamlined enclosure for the system so as to minimize the drag imposed upon the aircraft or other vehicle from which the system is suspended.

Bushings 26 are coupled to stator 56 of bearing and motor assembly 28. Tapered pin 30 is attached to top flange 58 which is also coupled to stator 56. Stator 56 is hollow, as is support post 20, to facilitate the routing of electrical wiring to the camera and gyro electronics.

Dome mounting flange 60 rotates about stator 56 supported on bearings 62. Dome mounting flange 60 and dome 34 are driven by motor windings 64a and 64b. Dome 34 is thus able to rotate a full 360° and maintain the camera window (not shown) in alignment with the azimuthal pointing direction of the camera. Positioning of the dome window is accomplished via inductive sensors (not shown) disposed on the inner surface of dome 34 which detect rotational displacement from a position reference secured to the gyro platform The enclosure drive system causes dome 34 to follow the camera lens or sensor position providing a clear view that is displayed to the operator on a monitor located at the control console. A similar technique for maintaining alignment between the dome and camera is described in U.S. Pat. No. 3,638,502 and, thus, will not be further described herein.

Figure 4:
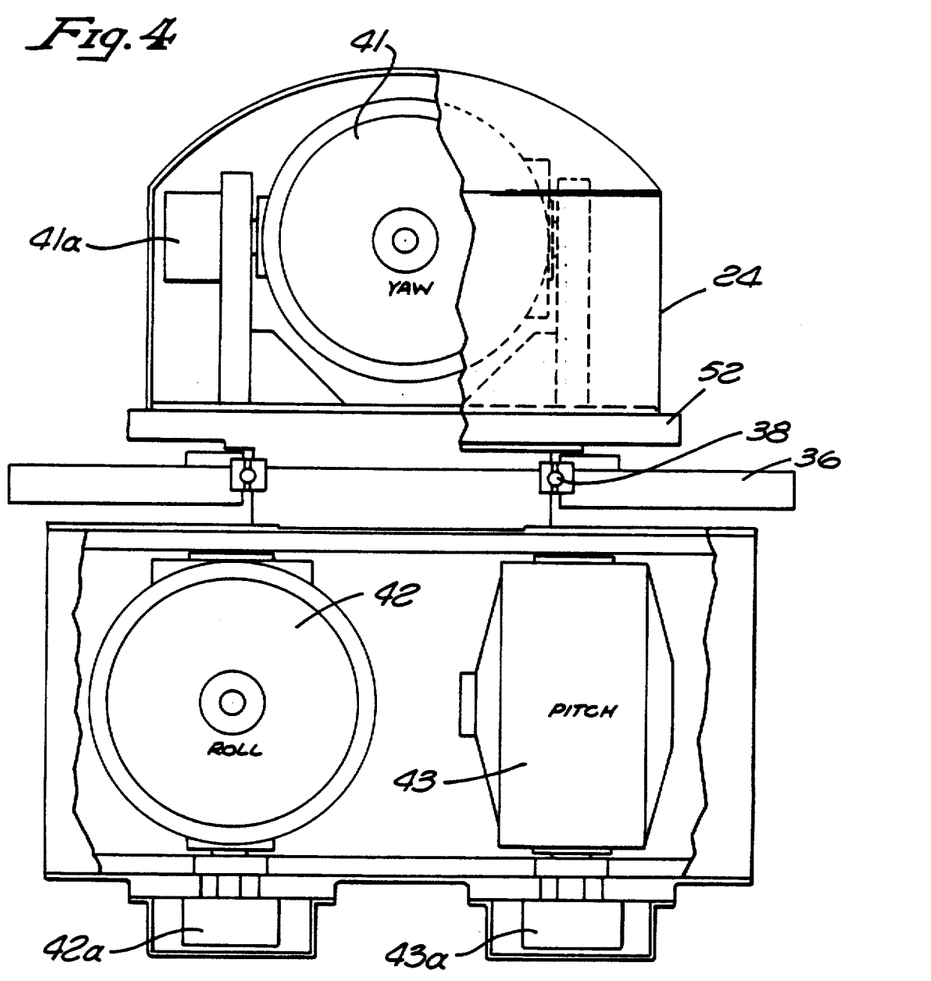
FIG. 4 cross sectional view through line 4—4 of FIG. 3 showing the gyro assembly.
Figure 5:
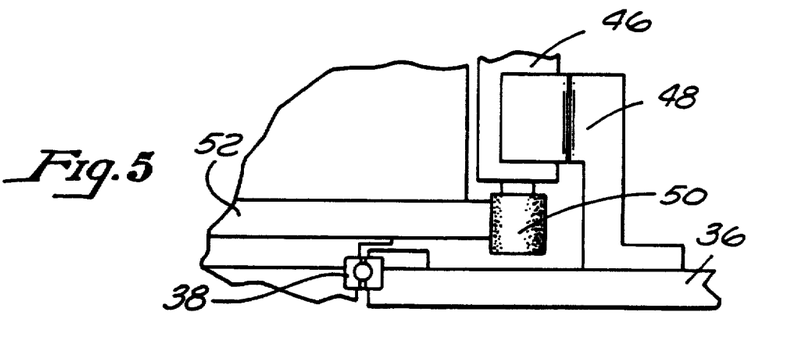
FIG. 5 is a detailed view taken along line 5—5 of FIG. 2.

Referring now primarily to FIGS. 4 and 5, details of the construction of the gyrostabilizer assembly 24 will be described. Assembly 24 includes yaw rate gyro 41, roll rate gyro 42 and pitch rate gyro 43. Rate gyros 41, 42 and 43 are conventional in design and have associated precession position sensors 41a, 42a and 43a, respectively. Because of the orthogonal arrangement of the three rate gyros, gyrostabilizer assembly 24 inherently resists rotational movement about all axes. Panning of camera 10 is thus accomplished by causing platform 18 to rotate about assembly 24. Bearing 38 permits full 360° relative rotation between top plate 36 of platform 18 and gyro assembly 24. Rotation of platform 18 about assembly 24 is effectuated by pan motor 46 which is secured to top plate 36 by means of bracket 48 as illustrated in FIG. 5. An elastomeric drive wheel 50 is mounted to the shaft of pan motor 46 and bears against outer ring 52 of gyro assembly 24.

Figure 7:
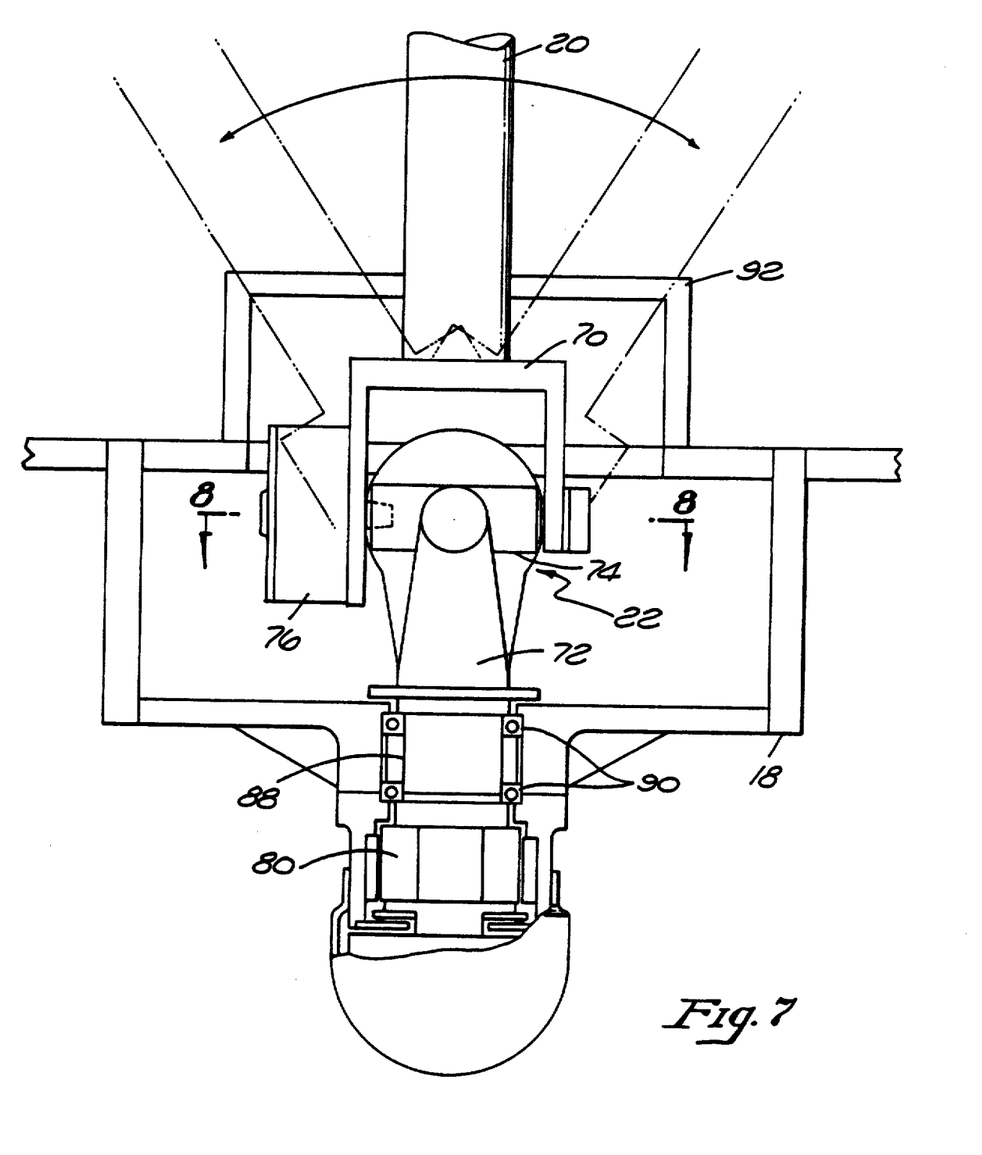
FIG. 7 detailed cross sectional view of the universal joint and lower bearing assembly taken through line 7—7 of FIG. 1.
Figure 8:
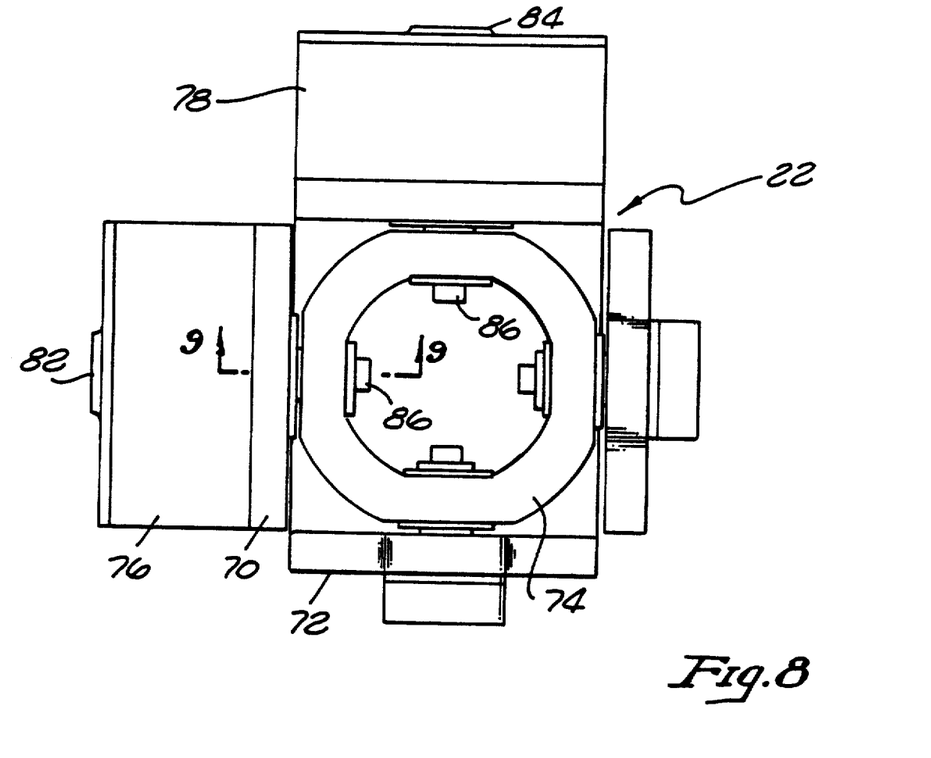
FIG. 8 is a detailed plan view of the universal joint taken along line 8—8 of FIG. 7.
Figure 9:
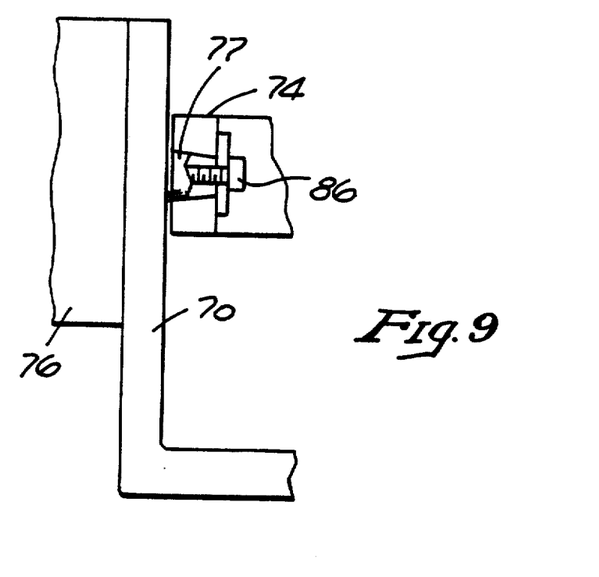
FIG. 9 a detailed cross sectional view taken along line 9—9 of FIG. 8.

FIGS. 7-9 illustrate the stabilization torquing system of the present invention. Support post 20 terminates at its lower end at yoke 70. Yoke 70, in combination with yoke 72 and spider 74 comprise universal joint 22. The axes of joint 22 define the pitch and roll axes of the stabilization system. The outer axis is the roll axis and is acted upon by roll torque motor 76 mounted to yoke 70. The inner axis is the pitch axis and is acted upon by pitch torque motor 78 mounted to lower yoke 72.

Torque inputs are transmitted through universal joint 22 as illustrated in FIG. 9. Shaft 77 of roll torque motor 76 is tapered and fits into a mating tapered aperture in spider 74. Spider 74 is secured to motor shaft 77 by means of bolt 86. Spider 74 is likewise secured to the shaft of pitch motor 78 in a similar manner. Roll and pitch position sensors 82 and 84 are coupled to their respective torque motors to sense the angular position of the motor shaft.

Lower yoke 72 is attached to shaft 88 which passes through platform 18 and is located therein by bearings 90. Shaft 88 defines the yaw axis of the stabilization system and is acted upon by yaw torque motor 80. Platform 18 can thus rotate a full 360° in yaw and can tilt approximately 35° in roll and pitch. Roll and pitch excursions are limited by bumper ring 92 which is rigidly mounted on platform 18 to constrain the movement thereof about support post 20. The limits of travel in the pitch axis are illustrated by the phantom lines in FIG. 7.

Figure 11:
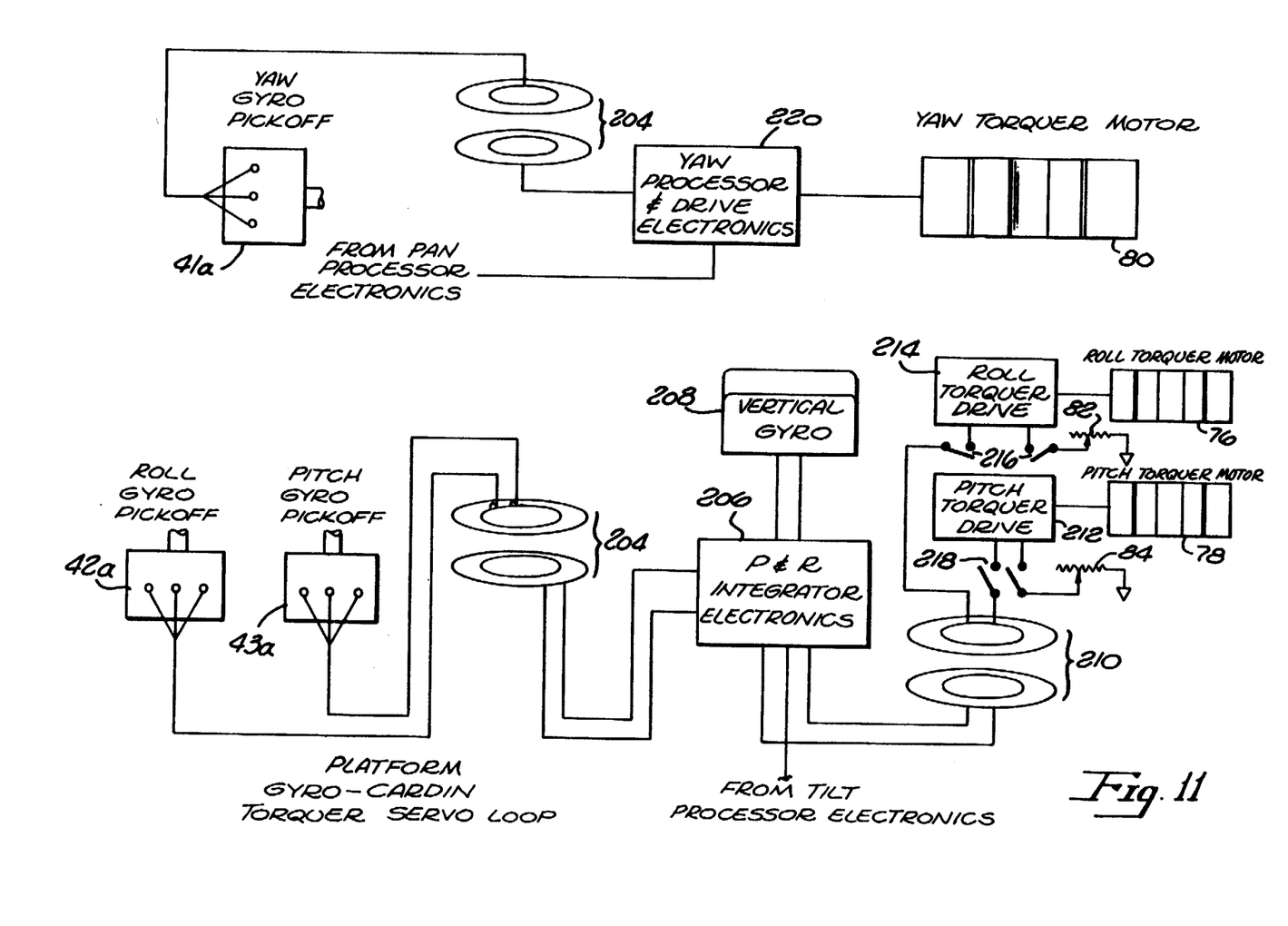
FIG. 11 is a schematic diagram of the stabilization servo control loop of the present invention.

The gyro-torquer servo loop is diagrammed in FIG. 11. Signals representing roll and pitch precession angles are provided by angular position sensors 42a and 43a, respectively. Since the roll and pitch signals interact as a function of pan angle, the signals from position sensors 42a and 43a are applied to resolver and slip ring assembly 204 where they are resolved through the pan angle so as to be translated into a coordinate system fixed with respect to platform 18 In the described embodiment, a 360° resistive sin-cosine element is incorporated in association with bearing joint 38 which couples gyrostabilizer assembly 24 to platform 18. The resolved pitch and roll signals are thus passed from the gyrostabilizer assembly 24 to platform 18.

The pitch and roll precession angles in platform coordinates are applied to pitch and roll integrator electronics package 206 where torquer drive commands for the pitch and roll torquer motors are developed. Direct drive of pitch torquer motor 78 and roll torquer motor 76 based on the amplitude of the pitch and roll gyro precession angles causes platform 18 to be tilted with respect to support post 20, thereby tending to return pitch and roll gyros 42 and 43 to their erect positions in spatial coordinates.

In addition to pitch and roll precession angles in platform coordinates, pitch and roll integrator electronics 206 receives inputs from vertical gyro 208. Vertical gyro 208 is physically mounted on platform 18 (as may be seen in FIG. 2) and provides spatial reference signals for aiding in maintaining platform 18 in a spatially level orientation. Reference signals from vertical gyro 208 are combined at a relatively low level with the pitch and roll precession signals so that the primary control loop is through gyrostabilization.

Physically associated with yaw bearing assembly 90, is a second sin-cosine element 210 that transforms the pitch and roll signals from platform coordinates through the yaw (camera pan) angle of platform 18 to a coordinate system fixed with respect to the axes of universal joint 22. The resolved command signals are then amplified by pitch and roll torquer drives 212 and 214 and then applied to respective torquer motors.

Switches 216 and 218 allow the gyro driven command signals to be disabled, such as during gyro spin-up, and replaced with position signals from potentiometers 82 and 84. Thus, during platform initialization, the platform 18 is driven to a near level orientation perpendicular to support post 20. Once the gyros are up to speed, the inputs from potentiometers 82 and 84 are deasserted and platform stabilization is controlled by pitch and roll gyros 42 and 43, aided by vertical gyro 208.

Command of the yaw torquer motor 80 is considerably more straightforward since the yaw angle need not be transformed between coordinate systems. The yaw gyro precession angle is sensed by position sensor 41a whose output signal is transmitted across resolver and slip ring assembly 204 to yaw processor and drive electronics 220. This latter unit develops the yaw torquer drive signal that is delivered to yaw torquer motor 80.

Figure 12:
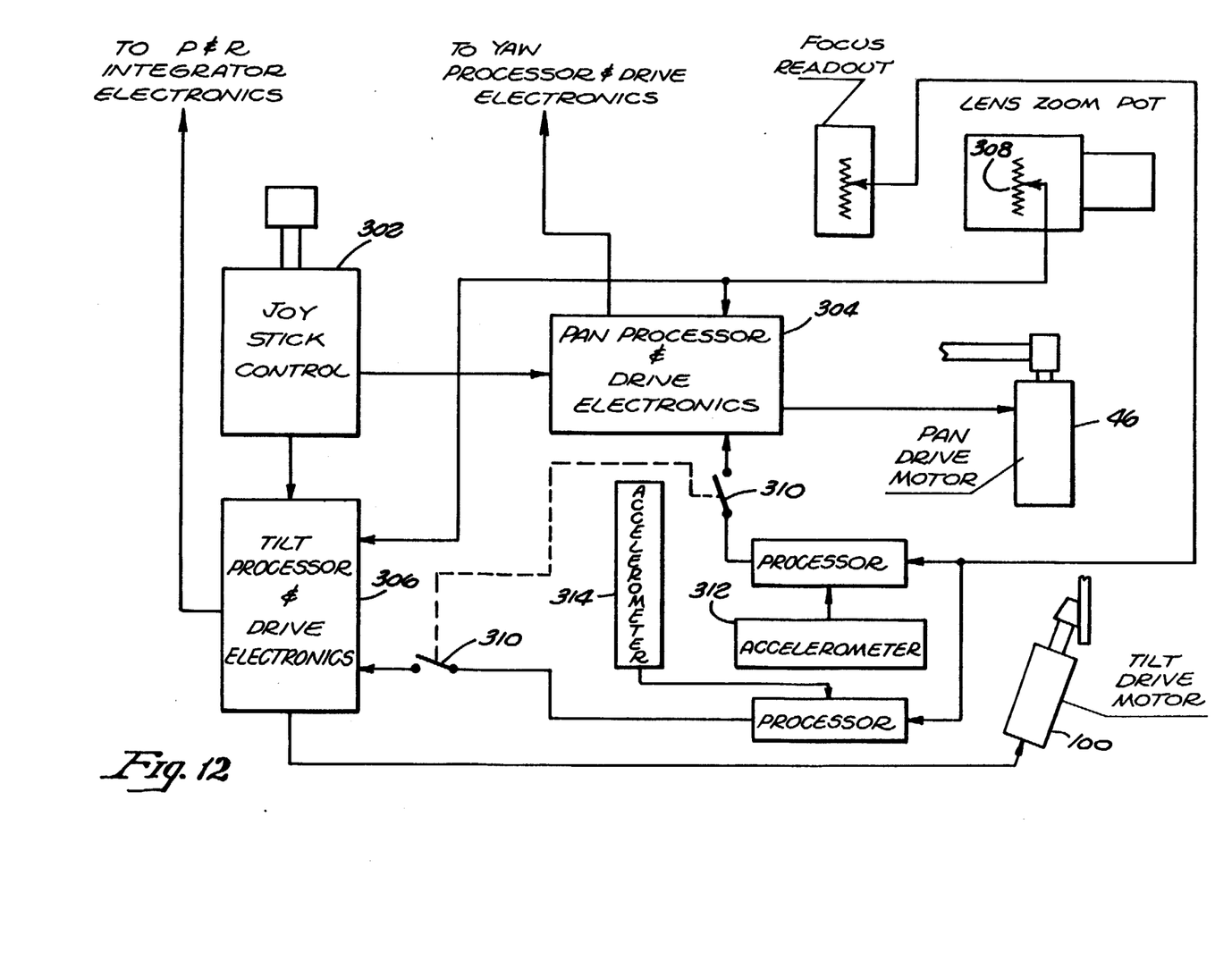
FIG. 12 is a schematic diagram of the pan and tilt control circuitry of the present invention.

As thus far described, the servo control loop will maintain platform 18 and camera 10 in a fixed spatial orientation. Referring now to FIG. 12, control of the camera pan and tilt angle will be described. The camera operator, located in the vehicle carrying the camera system or located on the ground in the case of a remotely controlled system, is provided with an operator's console that includes a joy stick controller 302. Side-to-side movement of controller 302 provides a variable input to pan processor and drive electronics unit 304 which then develops a drive signal for pan drive motor 46. As previously described, pan motor 46 causes platform 18 to rotate with respect to gyrostabilizer platform 24, thereby causing camera 10 to pan in azimuth. A low level signal from the pan processor is also applied to yaw processor and drive electronics 220 to provide a drive signal to the yaw torque motor 80 in anticipation of the inertial transient that will be sensed by yaw gyro 41 when pan motor 46 first begins to rotate.

In an analogous manner, fore and aft movement of controller 302 provides a variable input to tilt processor and drive electronics unit 306 which then develops a drive signal for tilt motor 100. A low level signal from the tilt processor is also applied to pitch and roll integrator electronics unit 206 to anticipate the inertial transients that will be sensed by pitch and roll gyros 42 and 43 as tilt motor 100 begins to rotate.

Sensitivity of the pan and tilt processors to inputs from the controller 302 is adjusted as a function of the focal length of zoom lens 12 which is sensed by potentiometer 308. Thus, when lens 12 is set to a short focal length (wide angle) the pan and tilt motors are more sensitive to operator commands than when lens 12 is zoomed in on an object.

It will be appreciated that maintaining camera 10 in a space stabilized orientation will generally not keep a fixed object in the camera's field of view since any movement of the vehicle carrying the camera system will cause a shift in the line of sight to the object. In order for an operator to detect a change in position of the camera/sensor and the subject/target during a photographic mission, the operator must either observe a positional change of the subject/target on the monitor or sense inertially, through a change in attitude or acceleration of the carrying vehicle a change in the spatial relationship between the vehicle and the subject/target. Generally speaking, the reaction time of a human is not fast enough to maintain a precise positioning of the subject/target within a small field of view. To compensate for vehicle movements, an automatic steering system is provided. Switch 310 selectively activates the automatic steering system for maintaining an object to be photographed within the camera's field of view and also to maintain such object in proper focus.

The automatic steering system of the present invention reacts to linear accelerations in all three axes and results in the ability to steer the camera in both azimuth and elevation to a point in space. This steering system consists of three linear accelerometers, one oriented at 90° across the optical axis of the camera and parallel to the azimuth joint of the gyro stabilizer assembly, the second oriented at 90° across the optical axis and parallel to the elevation joint axis and mounted exactly on the center line of the joint, and the third parallel to the optical axis.

The output of accelerometer 312 is injected into the pan angle control circuitry, the output of accelerometer 314 is injected into the tilt (elevation) steering circuitry and the output of the third accelerometer (not shown) is injected into the focusing circuitry. The initial manual focus setting (a function of range to the subject/target) will determine the attenuation of signals being injected from the accelerometers relating to pan (azimuth) and tilt (elevation). In this way the camera/sensor will automatically steer or pivot around a point in space whose coordinates have been specified by the operator's initial steering commands and focus setting. Any accelerations of the camera carrying vehicle will be compensated for by the automatic steering system and the camera will automatically steer to remain pointed at and focused on the original spatial coordinates to which it was set when the automatic steering/focusing system was activated. This system is especially valuable when the camera is mounted on a helicopter and is imaging a fixed target.

If the operator wishes to film a subject standing on a hillside with the system mounted on a helicopter, for instance, the automatic inertial steering circuitry may be utilized so that the subject will remain positioned precisely in one spot of the picture for a long duration. This is accomplished by steering the camera to track the subject manually using the joy stick control, then focusing the image carefully and energizing the automatic inertial steering circuitry. This will result in the system steering itself automatically to hold the subject precisely at the same spot in the frame that it occupied when the circuitry was energized. Additionally, any variation in distance between the camera and the subject will be compensated in focus and this updates the attenuation for the pan/tilt automatic steering inputs at the same time. Even with the inertial steering system switched on, the operator may still inject manual steering corrections as may be required, for example to compensate for movement of the subject.

Camera steering inputs may be recorded digitally through the use of high resolution incremental or absolute optical encoders incorporated into the pan and tilt motors or driven directly from the rim of the gyro stabilizer assembly or tilt drive rim. The same encoder arrangement may be applied to the film camera drive motor and the lens iris, focus and zoom motors. The signals provided by such encoders may be fed through converter electronics connected to a small computer containing a disc drive or solid state digital recording capability, so that recording of all camera steering, frame rates and lens settings is possible. The recorded movements can then be precisely repeated by the platform and camera system by playing back the recorded data into the system's electronics. Additionally, movements can be preprogrammed and recorded on a compatible computer and then played back during operation of the stabilized mount system. In this way, material photographed or recorded with the system can be easily integrated with other imagery that was previously photographed with the system or was photographed using motion control photographic systems such as those employed for special visual effects within the film industry. This ability may also be used to control movement of props, such as models, that are being photographed for inclusion in previously filmed backgrounds, the various moves having been recorded at the time the background scenes were filmed.

When the stabilization system is first energized, the direct drive torquing motors and potentiometers on the cardan joint will cause the platform to assume a near level position and will hold the platform and gyros steady while the gyro wheels come up to operating speed. After this has occurred, the outputs from the cardan joint axis potentiometers are disconnected from the cardan torquer motor servo circuitry and the inputs from all gyros are connected to the cardan joint torquers and the platform yaw joint torquer. Any out-of-level condition is then be corrected by the signals being injected by the vertical reference gyro. Centering springs acting upon the rate gyros relating to platform pitch and roll will torque these gyros into the erect position in spite of the attitude change of the platform due to the initial correction commanded by the vertical reference gyro. Once erected, the system may be steered by activating the pan and tilt motors controlled by the joy stick located at the operator's console. When a change in pan angle is commanded, initial acceleration of the platform in azimuth tends to precess the yaw oriented rate gyro. This is sensed by the precession axis sensor which inputs a signal to drive the direct drive torque motor on the platform yaw axis in the proper direction, thereby causing the yaw rate gyro to return to its erect position. Likewise, when a pan steering movement is terminated and the pan motor brakes the platform's rotation around the gyro stabilizer assembly, the yaw gyro, giving up energy, will precess in the opposite direction causing the yaw torquer motor to energize and return the yaw gyro to its erect position in its mounting. A corresponding process effectuates tilt commands, with the cardan joint torquer motors reacting to maintain the platform pitch and roll rate gyros in an erect orientation. In a similar manner, the servo loops will react to counteract any disturbance that may act on the platform during transportation by a vehicle. For instance, bearing friction in the cardan joint and the yaw joint could conceivably influence the platform during vehicle attitude changes and the torquer motors correct for this.

As a method of reducing reaction time of the servo loops, the system injects a small signal from both pan and tilt steering commands directly into the appropriate torquer axis circuitry, bypassing the gyro precession sensors so that gyro precession is greatly reduced and smoothness of fine steering inputs is increased.

It will be recognized that the above described invention may be embodied in other specific forms without departing from the spirit or essential characteristics of the disclosure. Thus, it is understood that the invention is not to be limited by the foregoing illustrative details.

I claim:

1. A gyroscopically stabilized system for pointing a sensor comprising:
   a support;
   a universal joint coupled to said support and having rotational freedom about first and second perpendicular axes;
   a platform for mounting said sensor;
   bearing means for coupling said platform to said universal joint so that said platform is rotatable about a third axis perpendicular to both of aid first and second axes;

first and second torque motor means coupled to said universal joint for applying torquing moments about said first and second axes respectively;

third torque motor means coupled to said bearing means for applying a torquing moment about said third axis;

a gyrostabilizer assembly coupled to said platform and including at least three orthogonally oriented gyroscopes, each of said gyroscopes having means for sensing a precession angle thereof and generating an output signal proportional thereto;

servo control means for receiving said output signals of said precession angle sensing means, developing torque command signals therefrom and applying said torque command signals to said first, second and third torque motor means so as to maintain said platform n a space stabilized orientation;

wherein the center of gravity of said system is coincident with the intersection of said first, second and third axes.

2. The system of claim 1 wherein said sensor comprises a motion picture camera.

3. The system of claim 1 wherein said sensor is rotatably mounted on said platform and is selectively rotatably positionable with respect to said first axis.

4. The system of claim 3 further comprising tilt control means for selectively rotatably positioning said sensor with respect to said first axis.

5. The system of claim 4 wherein said tilt control means comprises a manually operated joy stick.

6. The system of claim 4 wherein said tilt control means provides a tilt command input signal to said servo control means, said servo control means combining said tilt command input signal with said output signals of said precession angle sensing means to develop said torque command signals, thereby compensating for an inertial transient when said sensor is rotatably positioned with respect to said first axis.

7. The system of claim 6 wherein said sensor is a camera having a zoom lens and said tilt command input signal is selectively attenuated as a function of operating focal length of said zoom lens.

8. The system of claim 1 wherein said gyrostabilizer assembly is rotatably coupled to said platform on a fourth axis parallel to said third axis and is selectively positionable about said fourth axis in relation to said platform such that said sensor is selectively positionable with respect to said third axis.

9. The system of claim 8 further comprising pan control means for selectively rotatably positioning said sensor with respect to said third axis.

10. The system of claim 9 wherein said pan control means comprises a manually operated joy stick.

11. The system of claim 9 wherein said pan control means provides a pan command input signal to said servo control means, said servo control means combining said pan command input signal with said output signals of said precession angle sensing means to develop said torque command signals, thereby compensating for an inertial transient when said sensor is rotatably positioned with respect to said third axis.

12. The system of claim 11 wherein said sensor is a camera having a zoom lens and said pan command input signal is selectively attenuated as a function of operating focal length of said zoom lens.

13. The system of claim 1 further comprising vertical gyro means for sensing a spatially level reference and for providing level reference input signals to said servo control means, said servo control means combining said level reference input signals with said output signals of said precession angle sensing means to develop torque command signals, thereby maintaining said platform in an approximately spatially level orientation.

14. The system of claim 1 further comprising:

first and second accelerometer means for sensing respective accelerations along respective perpendicular axes each perpendicular to an operative axis of said sensor and for providing first and second accelerometer signals to said servo control means; and focal distance measuring means for determining the distance to an object upon which said sensor is focused and for providing a focal distance signal to said servo control means;

said servo control means combining said first and second accelerometer signals with said output signals of said precession angle sensing means to develop said torque command signals, thereby maintaining said operative axis of said sensor directed at said object.

15. A gyroscopically stabilized system for pointing a sensor comprising:

a support;

a universal joint coupled to said support and having rotational freedom about first and second perpendicular axes;

a platform for mounting said sensor;

bearing means for coupling said platform to said universal joint so that said platform is rotatable about a third axis perpendicular to both of said first and second axes;

positioning means for rotating said platform about said first, second and third axes;

a gyrostabilizer assembly coupled to said platform and including at least three orthogonally oriented gyroscopes, each of said gyroscopes having means for sensing a precession angle thereof and generating an output signal proportional thereto;

servo control means for receiving said output signals of said precession angle sensing means, developing command signals therefrom and applying said command signals to said positioning means so as to maintain said platform in a space stabilized orientation;

said system having a center of gravity coincident with the intersection of said first, second and third axes.

16. The system of claim 15 wherein said sensor comprises a motion picture camera.

17. The system of claim 15 wherein said sensor is rotatably mounted on said platform and is selectively rotatably positionable with respect to said first axis.

18. The system of claim 17 further comprising tilt control means for selectively rotatably positioning said sensor with respect to said first axis.

19. The system of claim 18 wherein said tilt control means comprises a manually operated joy stick.

20. The system of claim 18 wherein said tilt control means provides a tilt command input signal to said servo control means, said servo control means combining said tilt command input signal with said output signals of said precession angle sensing means to develop said command signals, thereby compensating for an inertial transient when said sensor is rotatably positioned with respect to said first axis.

21. The system of claim 20 wherein said sensor is a camera having a zoom lens and said tilt command input signal is selectively attenuated as a function of operating focal length of said zoom lens.

22. The system of claim 15 wherein said gyrostabilizer assembly is rotatably coupled to said platform on a fourth axis parallel to said third axis and is selectively positionable about said fourth axis in relation to said platform such that said sensor is selectively positionable with respect to said third axis.

23. The system of claim 22 further comprising pan control means for selectively rotatably positioning said sensor with respect to said third axis.

24. The system of claim 23 wherein said pan control means comprises a manually operated joy stick.

25. The system of claim 23 wherein said pan control means provides a pan command input signal to said servo control means, said servo control means combining said pan command input signal with said output signals of said precession angle sensing means to develop said command signals, thereby compensating for an inertial transient when said sensor is rotatably positioned with respect to said third axis.

26. The system of claim 25 wherein said sensor is a camera having a zoom lens and said pan command input signal is selectively attenuated as a function of operating focal length of said zoom lens.

27. The system of claim 15 further comprising vertical gyro means for sensing a spatially level reference and for providing level reference input signals to said servo control means, said servo control means combining said level reference input signals with said output signals of said precession angle sensing means to develop said command signals, thereby maintaining said platform in an approximately spatially level orientation.

28. The system of claim 15 further comprising:
first and second accelerometer means for sensing respective accelerations along respective perpendicular axes each perpendicular to an operative axis of said sensor and for providing first and second accelerometer signals to said servo control means; and
focal distance measuring means for determining the distance to an object upon which said sensor is focused and for providing a focal distance signal to said servo control means;
said servo control means combining said first and second accelerometer signals with said output signals of said precession angle sensing means to develop said command signals, thereby maintaining said operative axis off said sensor directed at said object.

* * * * *

UNITED STATES PATENT AND TRADEMARK OFFICE
CERTIFICATE OF CORRECTION

PATENT NO. : 4,989,466
DATED : February 5, 1991
INVENTOR(S) : Ronald C. Goodman

It is certified that error appears in the above-indentified patent and that said Letters Patent is hereby corrected as shown below:

In column 2 at line 32, please delete " a " and insert " is a ".

In column 2 at line 34, please delete " cross " and insert -- is a cross --.

In column 2 at line 38, please delete " a " and insert -- is a --.

In column 2 at line 40, please delete " detailed " and insert -- is a detailed --.

In column 2 at line 45, please delete " a " and insert -- is a --.

In column 9, claim 1 at line 1, please delete " aid " and insert -- said --.

In column 9, claim 1 at line 19, please delete " n " and insert -- in --.

In column 12, claim 28 at line 26, please delete " off " and insert -- of --.

Signed and Sealed this

Fourth Day of February, 1997

Attest:

BRUCE LEHMAN

Attesting Officer

Commissioner of Patents and Trademarks